(12) United States Patent
Meier

(10) Patent No.: US 6,191,857 B1
(45) Date of Patent: Feb. 20, 2001

(54) MEASURING METHOD AND APPARATUS

(75) Inventor: Andreas Meier, Wedemark (DE)

(73) Assignee: Walter AG, Tübingen (DE)

( * ) Notice: Under 35 U.S.C. 154(b), the term of this patent shall be extended for 0 days.

(21) Appl. No.: 09/489,960

(22) Filed: Jan. 24, 2000

Related U.S. Application Data

(63) Continuation of application No. 09/391,228, filed on Sep. 7, 1999, now abandoned.

(30) Foreign Application Priority Data

Sep. 5, 1998 (DE) .............................................. 198 40 628

(51) Int. Cl.⁷ .................................................... G01B 11/24
(52) U.S. Cl. ............................................ 356/376; 356/375
(58) Field of Search ................................... 356/375, 376, 356/384–387

(56) References Cited

U.S. PATENT DOCUMENTS 4,417,147 * 11/1983 Faville .................................. 356/376
4,863,275 * 9/1989 Cormack et al. ..................... 356/376
5,345,309 * 9/1994 Wertz et al. .......................... 356/376
5,749,142 * 5/1998 Hanamura ............................. 356/375

* cited by examiner

*Primary Examiner*—Frank G. Font
*Assistant Examiner*—Amanda Merlino
(74) *Attorney, Agent, or Firm*—Venable; Gabor J. Kelemen

(57) ABSTRACT

A method of measuring selected values of a specimen having at least one edge is performed with an apparatus which positions the specimen in the path of a light beam such that the specimen at least partially interrupts the light beam and the edge borders a shadow cast by the specimen. Further, the apparatus rotates the specimen about a rotary axis through at least one predetermined angle; monitors, by an observing apparatus, a boundary of the shadow cast by the edge; generates, by the observing apparatus, signals representing positions of the boundary; and evaluates the signals for determining the selected values.

19 Claims, 4 Drawing Sheets

MEASURING METHOD AND APPARATUS

CROSS REFERENCE TO RELATED APPLICATION

This is a continuation of U.S. application Ser. No. 09/391,228 filed Sep. 7, 1999 now abandoned.

This application claims the priority of German Application No. 198 40 628.2 filed Sep. 5, 1998 which is incorporated herein by reference.

BACKGROUND OF THE INVENTION

This invention relates to a method and an apparatus for measuring selected characteristic magnitudes of specimens which have at least one edge, particularly a cutting edge.

Particularly cutting tools, such as milling, drilling or other chip-forming tools, have cutting edges adjoined by a rake face and a relief face. The properties of the cutting edge as well as the position and properties of the rake face and the relief face, and particularly the rake angle and the relief angle form characteristic values which are often of particular significance in chip-forming cutting tools. Further, it may be required to determine the relief angle of the tool to be able to reproduce the same, for example by re-grinding, and also to measure the relief angle of ground or otherwise machined tools to monitor the machining result or to verify the machine settings.

Measuring methods which operate by contacting require a mechanical scanning of the cutting and/or relief faces and are limited in their resolution.

SUMMARY OF THE INVENTION

It is an object of the invention to provide an improved measuring method and apparatus of the above-outlined type which reliably detects the selected parameters of specimens (test pieces).

This object and others to become apparent as the specification progresses, are accomplished by the invention, according to which, briefly stated, the method of measuring selected values of a specimen having at least one edge is performed with an apparatus which positions the specimen in the path of a light beam such that the specimen at least partially interrupts the light beam and the edge borders a shadow cast by the specimen. Further, the apparatus rotates the specimen about a rotary axis through at least one predetermined angle; monitors, by an observing apparatus, a boundary of the shadow cast by the edge; generates, by the observing apparatus, signals representing positions of the boundary; and evaluates the signals for determining the selected values.

The measuring method and apparatus according to the invention provide for a contact-less measuring of edges and selected faces of specimens. The specimen is scanned by a light beam which, as a result, is partially blocked; that is, the illuminated specimen casts a shadow. For measuring or determining the desired parameter the specimen is moved and its shadow observed. For this purpose an observing apparatus, for example, a line camera or similar device is provided which detects the position of a light-to-dark transition. The light-to-dark transition is, as a rule, produced by the specimen edge to be examined. In case an angle or a position of a specimen face is to be determined as a characteristic value, the light-to-dark transition is generated in sequence for two edges which border the surface. For determining the characteristic value, the specimen is rotated in such a manner that the light-to-dark transition travels on the observing apparatus which, from the manner the light-to-dark transition travels as the specimen is rotated, draws conclusions concerning the values of interest.

It is an advantage of the method and the apparatus according to the invention that it determines characteristic values without contacting the specimen; measuring may be performed rapidly and, if required, in an automated manner. No particular equipment for measuring or testing the various specimens is required. It is not necessary to either replace the scanning components or to provide measuring edges or similar mechanical scanning devices which would have to be replaced.

By means of the optical measuring method and the optical apparatus according to the invention high-precision measurements may be performed even if the resolution of the observing apparatus is limited by the number of the individual light sensitive elements. This is in particular feasible if not only the number of the illuminated or, as the case may be, not illuminated elements is determined, but in the light-to-dark transition intermediate values are determined as well. This results in a resolution which is greater than the number of the light sensitive elements. The measuring accuracy of the detecting device which follows the rotation of the specimen is preferably so high that, for example, 0.1° or even smaller angular steps may be detected. Therefore, a very high number of measuring values may be worked with which, in turn, results in an accurate measurement of the specimen, at least as concerns the selected parameters.

If, for example, a relief angle is to be measured at a relief face of the specimen, the shadow of two specimen edges bordering the relief face and turned in sequence in the light beam is observed. It is an advantage of the invention that the angle of the relief face may be measured relatively independently from the actual configuration of the relief face. For example, a slightly concave relief face is considered as the imaginary connection between the cutting edge and a parallel edge spaced therefrom and bordering the relief face. As compared to mechanical scanning processes which rely on a contacting of the surface, the measuring reliability is appreciably increased.

The shifting of the shadow of the edge to be tested or, more precisely, the shifting of the light-to-dark boundary as a function of the rotation of the specimen yields further information which is detectable by the evaluating device. If, for example, an accurately formed edge of the specimen is rotated through the light beam, the length of the shadow detected by the observing apparatus represents a cosine curve as a function of the angle of rotation. The cosine function may contain a phase shift angle and an offset. Based on the deviation of the detected function from an ideal cosine function, conclusions may be drawn as concerns the quality of the edge, its rounding or chamfer size.

It is a further advantage of the process according to the invention that,. for example, the circumferential relief angle which is to be measured in a plane that is perpendicular to the rotary axis, may be determined independently from the inclination of the cutting edge. This permits the measurement of cutting edges and relief faces of chip-forming tools whose cutting edges extend parallel to the rotary axis or at an inclination thereto, as it is the case in helically grooved tools, conical milling tools or the like.

It has been found to be advantageous to approximate the measuring values obtained during rotation of the specimen through a light beam, as a cosine function and to read off the characteristic values of the tested edge or adjoining surface regions from such a cosine function or to obtain such values from cosine functions of different edges. The cosine curve of the shadow length as a function of the rotary angle is obtained while observing the projection of a mathematically exact edge and is thus an ideal function. By approximating the ideal function with actually obtained measuring values, the actual (real) edge is associated with an ideal edge. The relief face may then be considered, for example, as a planar face which connects two adjoining ideal edges with one another.

To obtain the parameters of the cosine function, a sectionwise regression has been found to be an advantageous approximation step. To perform such a regression, the angular values detected in small steps and the associated positional values of the light-to-dark transition of the shadow projection of the edge are gathered into value pairs, wherein several value pairs form a value pair group. For each value pair group then the searched-for cosine function is determined. In graphic terms, a regression section is shifted stepwise over the entire measuring curve. The regression sections in which the determinations of the cosine functions are effected may be selected as being either overlapping or non-overlapping. In the former case, a measuring value pair is simultaneously associated with a plurality of value pair groups, while in the latter case, each value pair belongs only to a single value pair group. An overlapping determination of the regression sections may be advantageous in the evaluation of measurements where only a relatively few measuring values can be made available and which are of generally coarse resolution. In case of a finer resolution it may suffice to determine the regression sections in a non-overlapping manner whereby the complexity of the computing process is held within narrower limits.

From the individual regression computations which are performed individually for each regression section, the parameters of the searched-for cosine function are determined in an advantageous manner by first discarding those parameters as invalid which very significantly deviate from the plurality of the other parameters. Such invalid values may appear at edge zones where the projection of shadow from one edge is about to be superposed by the projection of shadow from another edge. After discarding the invalid values, the parameters of the searched-for cosine function may be determined based on the frequency with which they occur. If the determined parameters are scattered, for example, about a mid value, then such a mid value (expected value) is retained as the searched-for parameter.

In contrast to mechanical measuring processes, according to the measuring process of the invention, at least in its preferred embodiment, the searched-for characteristic value is obtained by statistical evaluation of a plurality of individual measuring values, resulting in a high measuring reliability and precision. False measuring results due to small local deformations may be excluded or minimized. Further, by approximating an ideal cosine function with the obtained measuring data, it is feasible to diminish the influence of a rounding of the cutting edges on the measurement of the relief angle. The position of the cutting edge is unequivocally determined in the measuring process according to the invention even if the cutting edge has a chamfer or a rounding and thus does not constitute an edge in the mathematical sense.

Other approximation processes may find application besides the stepwise regression and the statistical processing of the parameters obtained in each regression section for arriving at a cosine-shaped approximation function. For example, the approximation may be performed with the method of the smallest error quadrant or with another approximation process which is adapted for determining a few parameters of the searched-for function, for example, the offset value and the phase shift angle in a cosine function, based on a significantly larger number (for example, 100) of measuring values.

DESCRIPTION OF THE PREFERRED EMBODIMENTS

Figure 1:
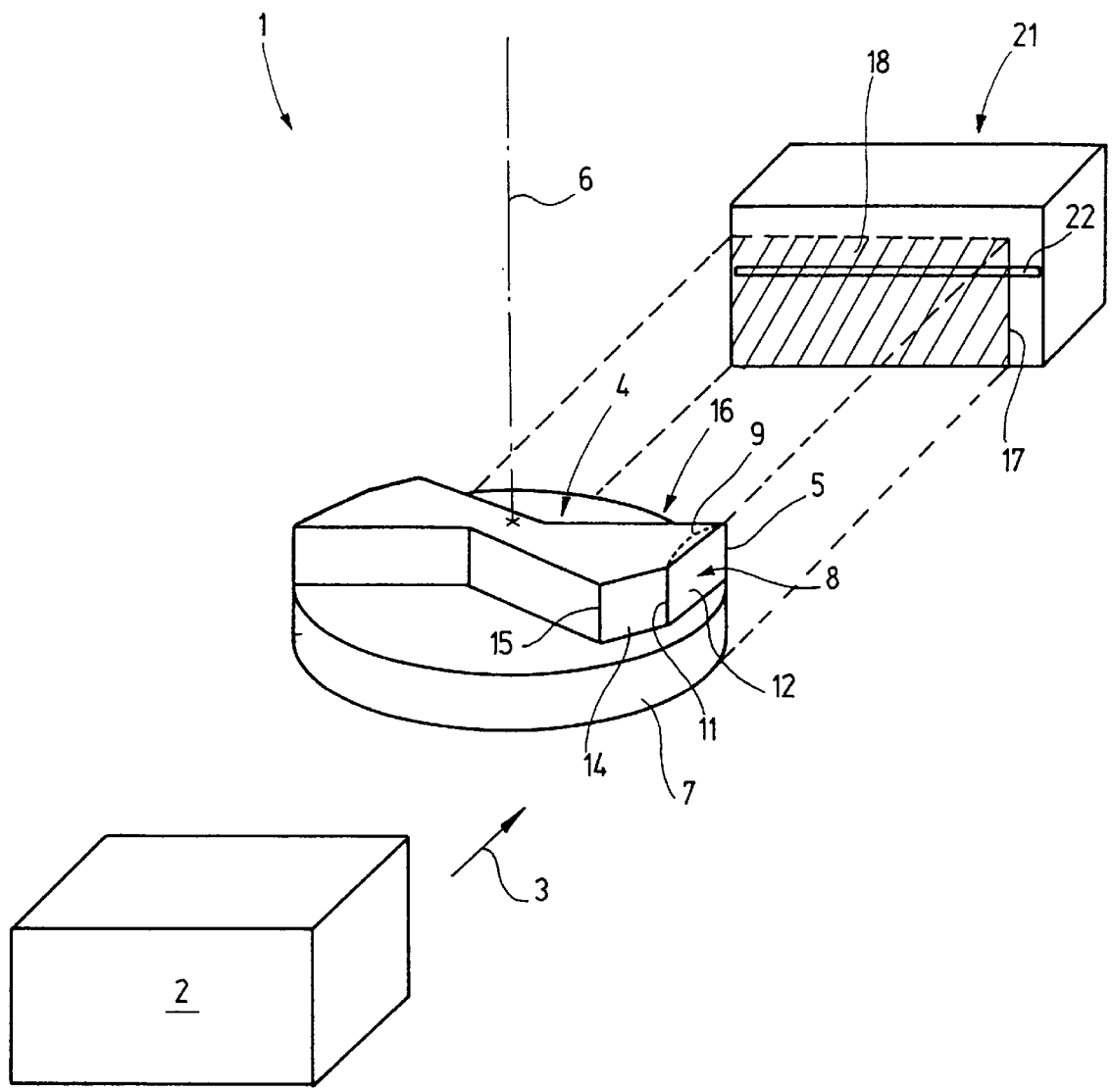
FIG. 1 is a schematic perspective representation of a measuring apparatus according to the invention showing a specimen to measured.

FIG. 1 shows a measuring apparatus generally designated at 1 and including a light source 2 which emits parallel light beams as indicated by the arrow 3. The light source may be a laser source or a spotlight source generating a light beam by means of suitable optics. It is also feasible to work with a non-parallel, for example, divergent light beam which, however, somewhat increases the complexity of the evaluation of the measurements. The preferably parallel light beam is directed to a specimen 4 which may be a chip-forming cutting tool having a cutting edge 5 which extends essentially parallel to an axis 6 about which the specimen 4 is rotated. The specimen 4 is supported in a specimen chuck 7 in such a manner that the rotary axis 6 of the specimen coincides with that of the chuck 7. The chuck 7 is supported in a suitable rotary device which provides for a continuous or, in the alternative, a stepwise rotation of the specimen 4 about its rotary axis 6.

The specimen 4 has a relief face 8 which adjoins the cutting edge 5 and which is planar in the example shown. As illustrated with a broken line 9 in an exaggerated manner, the relief face 8 may be concave or may deviate in other ways from a planar shape. At its side remote from the cutting edge 5 the relief face 8 is interrupted by a further edge 11 which divides the relief face 8 into respective first and second surface regions 12 and 14. The surface region 14 extends to a trailing edge 15 of the specimen 4.

The specimen chuck 7 is disposed in such a manner that the specimen 4 is partially in the path of the light beam and thus the specimen 4 casts a shadow. The cutting edge 5 which separates the relief face 8 from a rake face 16 of the specimen 4 produces—particularly when the rake face 16 is oriented perpendicularly to the light beam—a light-to-dark transition 17 which laterally borders the shadow 18 cast by the specimen 4. Such a light-to-dark transition 17 is produced particularly when the chip face 16 is oriented approximately transversely to the light beam. The light-to-dark transition 17, as depicted in FIG. 1, constitutes the projection of the cutting edge 5 and, if the specimen 4 is further rotated, it constitutes, in sequence, the projection of the edges 11 and 15.

To detect the shadow 18 and particularly the position of the light-to-dark transition 17, an observing apparatus 21 is provided which may have, for example, a CCD line 22 or any other arrangement with which the position of the light-to-dark transition 17 may be detected. The CCD line 22 is formed by a linear row of side-by-side arranged light sensitive elements. The row is oriented transversely to the direction 3 of the light beam and is furthermore perpendicular to the rotary axis 6. The length of the CCD line 22 is so dimensioned and the CCD line 22 is so arranged that the light-to-dark transition 17 is at all times in a region detected by the CCD line 22 if the rake face 16 of the specimen 4 is oriented transversely to the light beam. Further, the CCD line 22 has a length and a disposition such that the light-to-dark transition 17 can just be detected in a position when the cutting edge 5 is already in the shadow of the edge 11 or the trailing edge 15 and the latter determine the light-to-dark transition 17.

Figure 2:
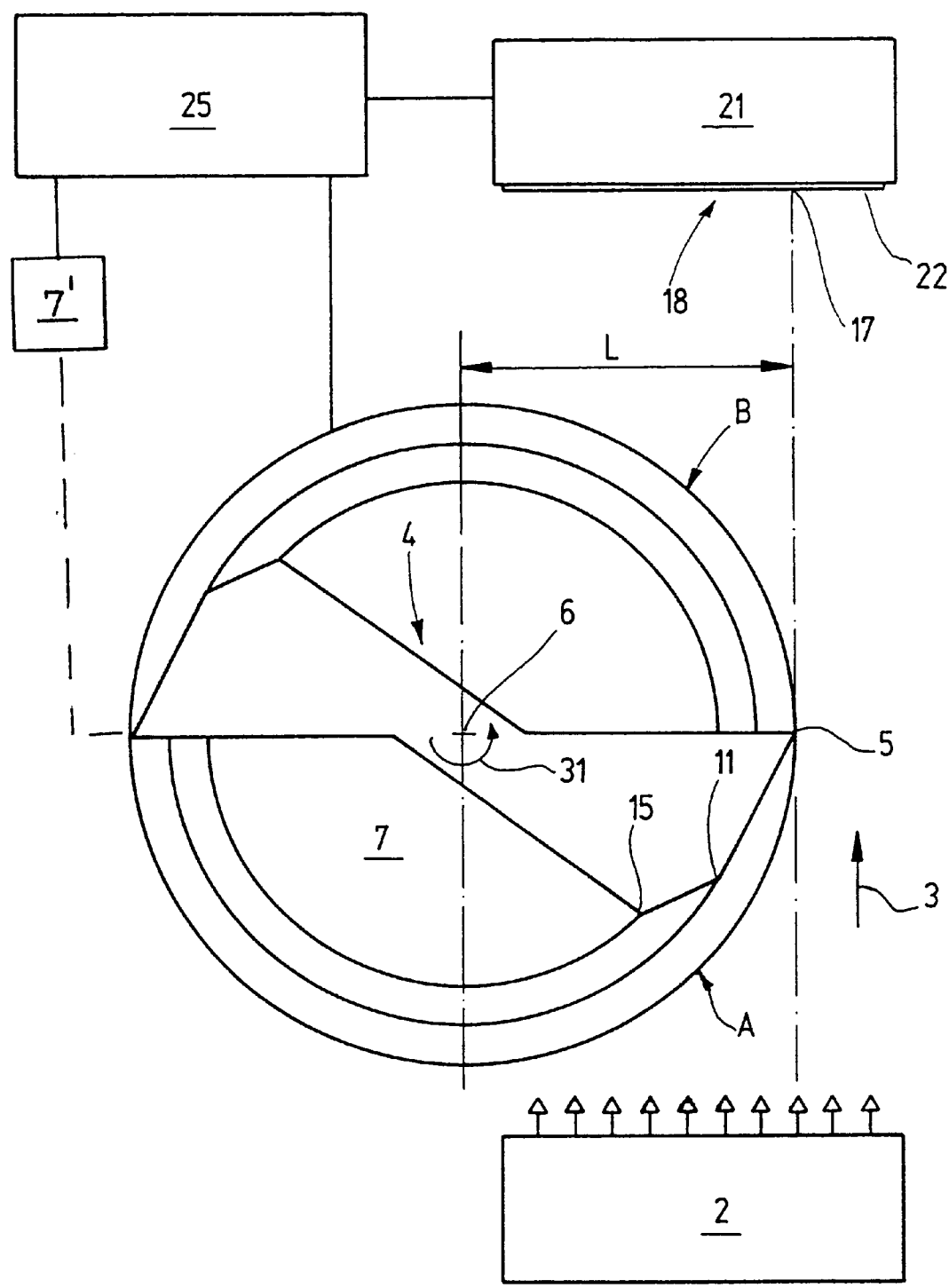
FIG. 2 is a schematic top plan view of the arrangement shown in FIG. 1.
Figure 3:
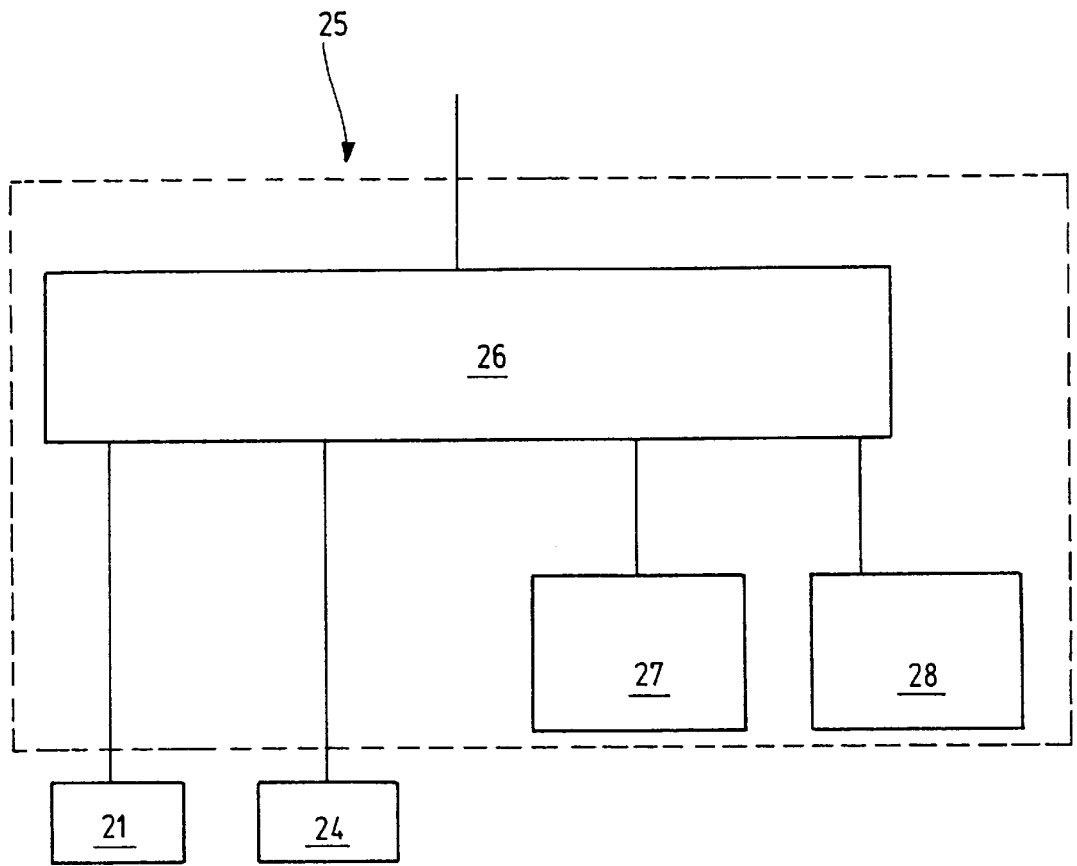
FIG. 3 is a block diagram showing an evaluating device associated with the measuring apparatus according to FIGS. 1 and 2.

In addition to the observing apparatus 21 for detecting the length of the shadow 18, a sensor device 24 is provided as schematically shown in FIGS. 2 and 3. The sensor device 24 senses the actual angle of rotation of the specimen 4 (that is, the angle of rotation of the specimen chuck 7) and applies a corresponding signal to a control and evaluating device 25. The sensor device 24 has an angle resolution which permits a detection of measuring values in close succession; for example, the minimum angle resolution may be approximately 0.1°. In case higher measuring value densities are desired, the resolution may be selected to be even higher.

The control and evaluating device 25 is coupled with a drive which is symbolically shown at 7' in FIG. 2 and which rotates the specimen chuck 7 either continuously or in increments for measuring the specimen 4.

For evaluating the signals received from the observing apparatus 21 and the sensor device 24, the evaluating and control device 25 has a central block 26 which may be a program run by a suitable computer. The central block 26 cooperates with a memory block 27 and a regression block 28. The memory block 27 contains or serves a hardware component which, in digitalized form, intermediately stores the signals (or data derived therefrom), applied to the observing apparatus 21 and the sensor device 24.

The regression block 28 is formed preferably by a program portion, a subprogram or a program module which defines parameters from a plurality of value pairs (dots) delivered by the central block 26. These parameters define a cosine function which approximates the given value pairs (dots) so that the dots lie on the thus-determined cosine function.

In the description which follows, the above-described measuring apparatus 1 will be set forth.

Figure 4:
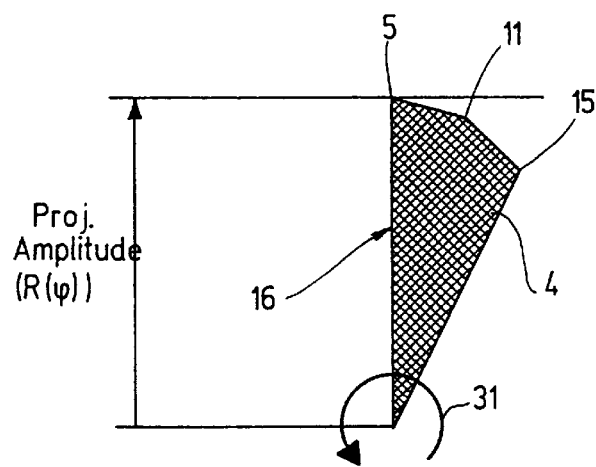
FIG. 4 is a diagram illustrating the geometrical relationships of a shadow projection of a specimen edge.
Figure 5:
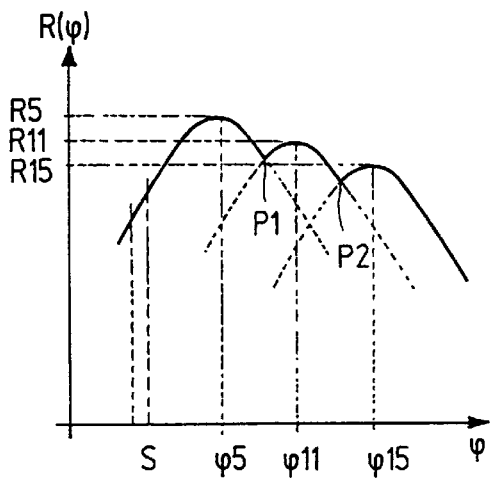
FIG. 5 illustrates a diagram showing the amplitude course during rotation of a specimen having three edges.

For explaining the mode of operation it is initially assumed that the relief angle of the relief face 8 is to be determined. For this purpose the control and evaluating device 25 commands the drive 7' to rotate the specimen chuck 7 relatively slowly in the direction of the arrow 31 shown in FIG. 2. As a result, the cutting edge 5 moves, for example, from position A to position B, and the angle traveled is approximately 90°. The point A is fixed such that the shadow 18 cast by the cutting edge 5 has definitely not yet reached its maximum length L. The point B is so selected that the shadow cast by the trailing edge 15 has positively attained and passed its maximum length. In FIG. 2 the cutting edge 5 is shown in a position in which the imaginary connecting line to the rotary axis 6 is perpendicular to the direction 3 of the light beam. In such a position, the shadow 18 has its maximum length L. Upon slow rotation of the specimen 4, at the CCD line 22 a shadow length $R(\phi)$ is obtained as a function of the rotary angle $\phi$ as illustrated in FIG. 5. Such a relationship may be seen in FIG. 4 from the geometrical representation of the projection conditions. For each edge 5, 11 and 15, the following formula applies:

$$R(\phi) = R \times \cos(\phi - \phi_0)$$

wherein R is the radius of the respective edge 5, 11 or 15 and $\phi_0$ is the angle of the respective edge 5, 11 or 15 relative to a reference position.

During rotation of the specimen 4 the cutting edge 5 first casts a shadow on the observing apparatus 21 and thus defines the light-to-dark transition 17. The more the specimen 4 approaches, during its rotation, the position in which the rake face 16 is perpendicular to the light beam, the greater is the amplitude detected by the observing apparatus 21, that is, as viewed in FIG. 2, the more the light-to-dark transition 17 shifts to the right. If the imaginary connecting line between the rotary axis 6 and the cutting edge 5 is oriented exactly at 90° to the light beam, then the angle designated at $\phi_5$ in FIG. 5 is reached and the amplitude $R(\phi)$ has attained its maximum value. Upon further rotation of the specimen 4 the amplitude $R(\phi)$ decreases. The amplitude $R(\phi)$ is a portion of a cosine function through the rotary angle $\phi$.

Upon further rotation of the specimen 4 the edge 11 gradually reaches a point P1 (FIG. 5) in which an imaginary connecting line between the cutting edge 5 and the rotary axis 6 is oriented parallel to the light beam. Upon further rotation the edge 11 casts a shadow while the cutting edge 5 is already in the shadow which has been cast by the edge 11. The amplitude function $R(\phi)$ is now determined by the edge 11. The maximum R11 is reached when the rotary angle $\phi$ is equal to the radial angle $\phi_{11}$ of the edge 11. After passing through the maximum R11, the amplitude function $R(\phi)$ again decreases until the trailing edge 15 starts casting its shadow at point P2. The amplitude function $R(\phi_0)$ reaches its maximum value R15 when the rotary angle is equal to the radial angle $\phi_{15}$ of the trailing edge 15. The measurement is preferably continued for a few degrees to obtain a good data basis.

The angle values detected by the sensor device 24 and the amplitude values determined by the observing apparatus 21 are applied by the central block 26 to the memory block 27. In this step with each discrete angle value $\phi$ an amplitude value R is associated. An angle value $\phi$ and the associated amplitude value R form a value pair $\phi$, R which marks one point on the solid-line curve shown in FIG. 5.

Figure 8:
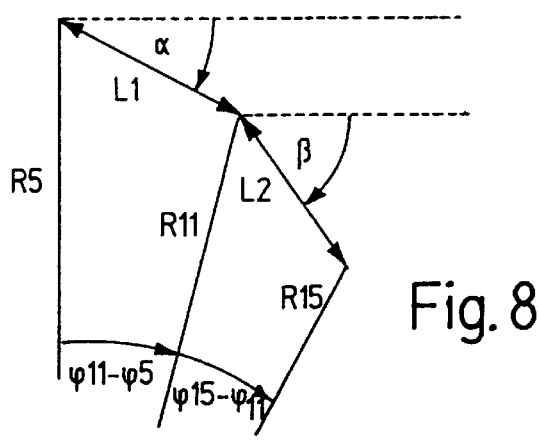
FIG. 8 is a diagram showing geometrical relationships concerning the specimen and for determining the searched-for relief angle.

For evaluating the measurements, for example, for determining the relief angles $\alpha$ and $\beta$ as shown in FIG. 8, the phase shift angles $\phi_5$, $\phi_{11}$ and $\phi_{15}$ as well as the belonging amplitude maxima R5, R11 and R15 have to be determined. In some instances, these also contain a summand or offset value K which also has to be determined. The purpose is to break down the curve of the function in FIG. 5 into three individual curves, each of which may be approximated as a cosine function by the formula $$f(\phi) = R \times \cos(\phi - \phi_0) + K.$$

The searched-for parameters of this cosine function are the radius R, the phase shift angle $\phi_0$ (that is, $\phi_5$, $\phi_{11}$ and $\phi_{15}$)

and the offset value K. As a total, three cosine functions are to be determined for which, however, in each instance from several tens up to several hundreds of individual value pairs may be present. The parameters, namely, the radius R, the offset value K and the phase shift angle φ are determined such that the cosine function defined thereby approximates the obtained measuring values as much as possible. This is achieved in the present embodiment by utilizing a regression computation. For this purpose, the rotary angle range φ over which measurements have been taken is broken down into regression sections S which contain at least three, but preferably more measuring points (value pairs). The regression portion is stepwise shifted over the entire function. The steps may correspond to the intervals of the measuring points or may be selected to be larger. In each step, that is, in each regression portion the three parameters (amplitude or radius R, phase shift angle φ and offset value K) are separately computed. For this purpose, the differential function of the above-noted cosine function is utilized:

$$m(\phi) = R \times \sin(\phi - \phi_0)$$

wherein $m(\phi)$ is the differential of the cosine function according to the angle and shows the local slope of the cosine function.

By using the substitution:
$y = \tan(\phi)$ $$x = \frac{m}{\cos(\varphi)}$$

$$a = \frac{1}{(R \cdot \cos(\varphi_0))}$$

$b = -\tan(\phi_0))$
the regression may be computed by the linear equation:
$y = a \cdot x + b$.

Figure 6:
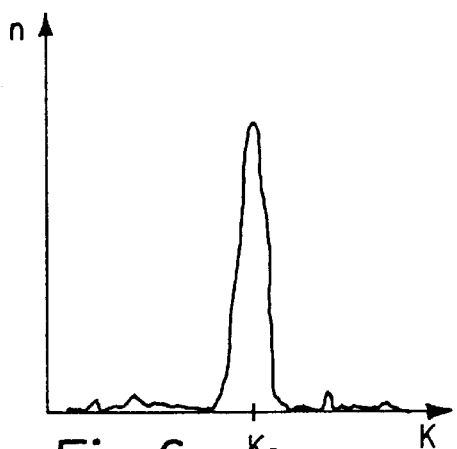
FIG. 6 is a diagram illustrating various offset values obtained in different regression steps.

This purpose is served by the regression block 28 which performs the regression for each regression portion. For each regression portion the results are constants K and value pairs φ, $R(\phi_5, R_5; \phi_{11}, R_{11}; \phi_{15}, R_{15})$ shown in FIGS. 6 and 7. As a rule, over the entire amplitude function $R(\phi)$ various offset values K appear which accumulate about a value K0. The offset value K0 is, as a rule, constant for all three cosine functions (that is, for all three edges) and designates a distance of the rotary axis 6 from a zero axis oriented parallel thereto. Offset values which significantly deviate from the frequently appearing value K0 occur upon calculation for a transition from one cosine function to another, that is, such offset-values occur at points P1 and P2. These offset values are characterized as invalid and are not considered.

The φ and R values are associated according to the frequency of their occurrence. The center of gravity for the value pairs determined for $\phi_5$ and $R_5$, that is, the mean value is taken as the value pair for the approximation of the cosine function for the cutting edge 5. The procedure is the same for the edges 11 and 15.

Figure 7:
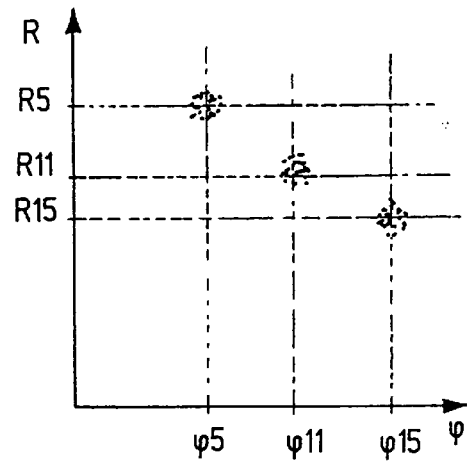
FIG. 7 is a diagram of various radius and angle values obtained in different regression steps.

The method is not limited to the presence of three edges. As may be readily seen, the number of the edges scanned by the light beam may be determined by the number of the measuring value accumulations or clusters as shown in the diagram of FIG. 7. Accordingly, the central block 26 automatically associates a corresponding number of approximation functions according to the number of the occurring clusters.

Based on the computed values obtained as discussed above, for example, the relief angle α or β may be determined. Known quantities are the angles $\phi_5$, $\phi_{11}$ and $\phi_{15}$ as well as the radii $R_5$, $R_{11}$, and $R_{15}$. The angle difference $\phi_{11}-\phi_{15}$ forms an inner angle of a rectangle with sides $R_5$ and $R_{11}$ and one side L1. Since two sides $R_5$ and $R_{11}$ as well as an inner angle of the triangle are known, the triangle is fully defined and all other angles, including the angle formed by the sides L1 and $R_5$ may be defined. This inner angle complements the searched-for relief angle α to 90° and thus α is determinable; such a determination is accordingly made by the central block 26. Similar procedures are followed as concerns the triangle which is formed by the radii R11, R15 and the inner angle $\phi_{15}-\phi_{11}$. The relief angle β and the adjoining inner angle complement one another to an angle which equals $90°+\phi_{11}-\phi_5$. The central block 26 computes the relief angle β accordingly.

Measuring is performed independently from the distance between the traveling edges, so that the measuring process may be utilized for determining the relief angle at large relief faces as well as for determining chamfer angles.

It will be understood that the above description of the present invention is susceptible to various modifications, changes and adaptations, and the same are intended to be comprehended within the meaning and range of equivalents of the appended claims.

What is claimed is:

1. A method of measuring selected values of a specimen having at least one edge, comprising the following steps:
    (a) positioning the specimen in the path of a light beam such that the specimen at least partially interrupts the light beam and said edge borders a shadow cast by the specimen;
    (b) rotating the specimen about a rotary axis through at least one predetermined angle;
    (c) monitoring, by an observing apparatus, a boundary of the shadow cast by said edge;
    (d) generating, by said observing apparatus, signals representing positions of said boundary; and
    (e) evaluating said signals for determining said values.

2. The method as defined in claim 1, wherein said signals are first signals, further comprising the steps of generating second signals representing angular positions of the specimen; and forming value pairs each composed of a second signal representing a particular angular position and a first signal representing a value detected by the observing apparatus in said particular angular position of the specimen.

3. The method as defined in claim 1, wherein said monitoring step comprises the step of following a shift of the shadow during rotation of the specimen in a direction which is oriented substantially perpendicularly to said rotary axis.

4. The method as defined in claim 3, further comprising the step of directing the light beam substantially perpendicularly to the rotary axis and perpendicularly to the direction in which the shift of the shadow is followed.

5. The method as defined in claim 2, further comprising the step of approximating the value pairs zone-wise by a cosine function for evaluating said first signals.

6. The method as defined in claim 5, wherein the specimen has at least two cutting edges; further comprising the steps of determining, from the value pairs, a radius constant, an angle constant and an offset constant contained in the cosine function and determining the cosine function for at least two cutting edges of the specimen.

7. The method as defined in claim 6, further comprising the step of determining an angle of a surface region from the cosine functions of adjoining edges which bound the surface region.

8. The method as defined in claim 2, further comprising the step of examining a deviation of an amplitude course defined by the value pairs and belonging to said edge, from an exact cosine function for drawing conclusions concerning a shape of said edge.

9. The method as defined in claim 2, further comprising the step of examining a deviation of an amplitude course defined by the value pairs and belonging to said edge, from an exact cosine function for drawing conclusions concerning a chamfer width of said edge.

10. The method as defined in claim 2, further comprising the step of examining groups of value pairs for determining individually a cosine function and parameters thereof.

11. The method as defined in claim 10, further comprising the step of classifying as valid those parameters which appear frequently in all groups assigned respectively to a single cosine function pertaining to a single edge.

12. A measuring apparatus for measuring selected values of a specimen having at least one edge, comprising (a) an illuminating device emitting a light beam having a light beam path;

(b) a specimen-receiving chuck holding and positioning the specimen in the light beam path for causing the specimen, including an edge thereof, to cast a shadow;

(c) means for rotating said chuck for rotating the specimen about a predetermined axis;

(d) a sensor device coupled to the chuck for emitting first signals representing angular positions of said chuck and the specimen;

(e) an observing apparatus receiving the shadow cast by the edge and emitting second signals representing positions of the shadow; and (f) an evaluating device connected to said sensor device and said observing apparatus for receiving and evaluating said first and second signals.

13. The apparatus as defined in claim 12, wherein the specimen has at least two edges and further wherein said evaluating device includes means for determining parameters of at least one cosine function for each specimen edge.

14. The apparatus as defined in claim 13, wherein said evaluating device includes means for determining angular positions and radii of measured edges from the cosine functions.

15. The apparatus as defined in claim 14, wherein said evaluating device includes means for drawing conclusions from the angular positions and radii of the measured edges concerning parameters of surfaces flanked by adjoining specimen edges.

16. The apparatus as defined in claim 12, wherein said evaluating device comprises a central block and a regression block; said central block including means for combining said first and second signals into value pairs and value pair groups and further wherein said central block has means for activating said regression block for each value pair group for determining a cosine function for each value pair group.

17. The apparatus as defined in claim 16, further comprising means for determining from each cosine function the angle of the radius of the edge casting the shadow and means for determining one of an expected value and a mean value of the obtained radii and angle as a valid radius value and a valid angle value.

18. The apparatus as defined in claim 12, wherein said means for rotating said chuck comprises a drive connected with said chuck; further comprising a control device connected with said evaluating device and said chuck; said chuck being controlled by said control device.

19. The apparatus as defined in claim 12, wherein said observing apparatus comprises a line camera having light sensitive elements arranged in a row; said row being oriented perpendicularly to said predetermined axis.

* * * * *